Patented Sept. 1, 1931

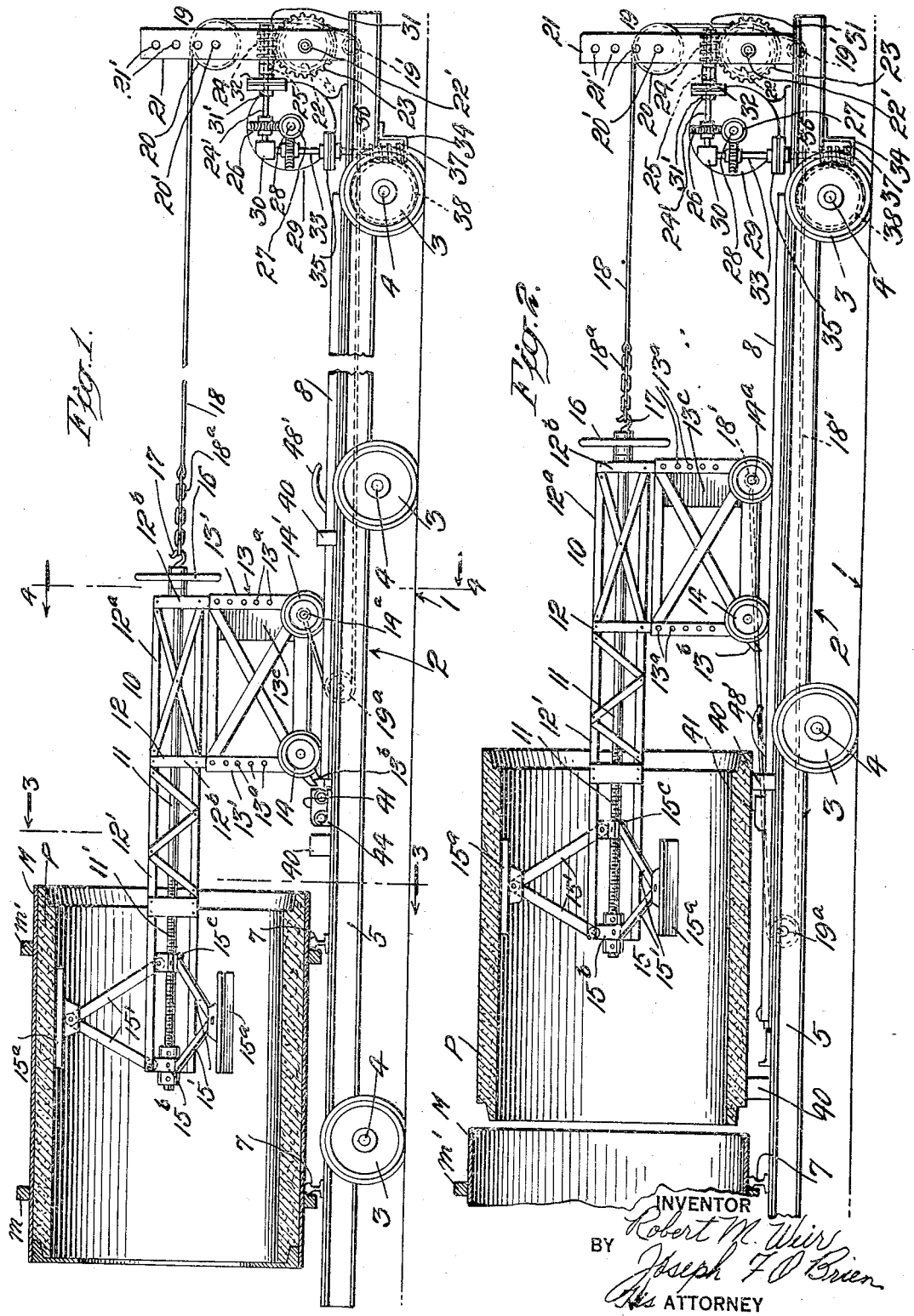

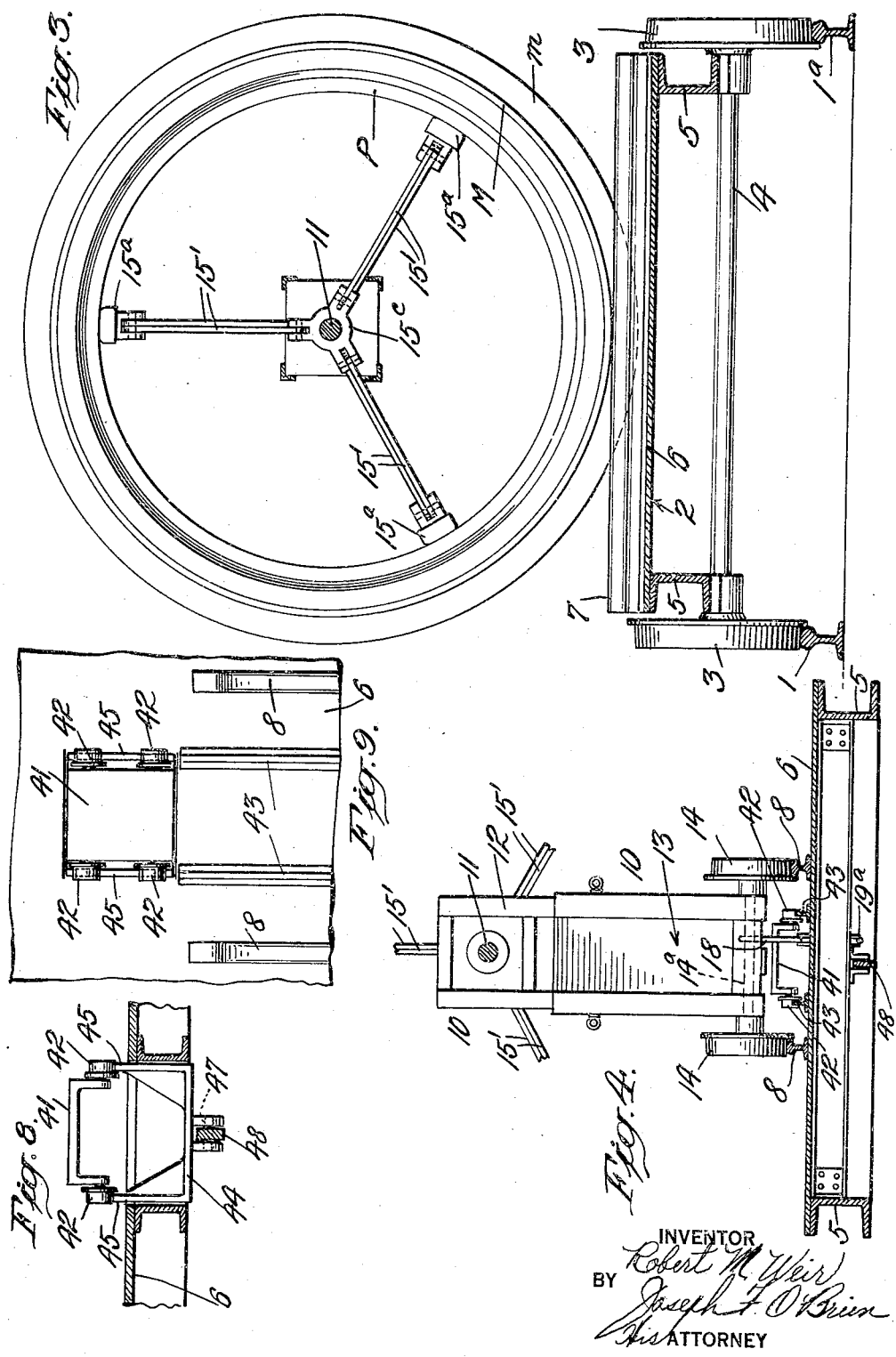

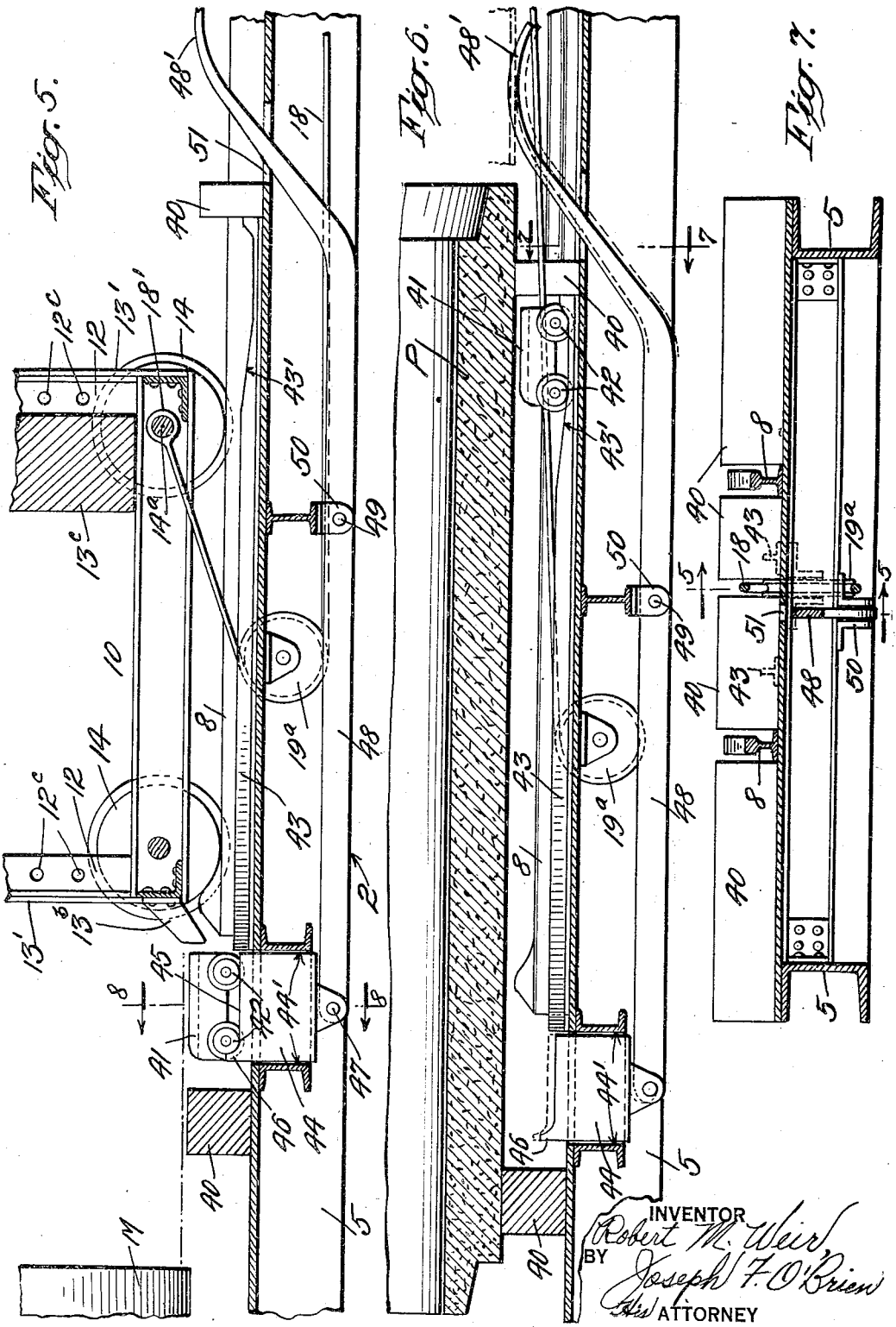

1,821,128

UNITED STATES PATENT OFFICE

ROBERT M. WEIR, OF MONTREAL, QUEBEC, CANADA, ASSIGNOR TO ASPHALTO CONCRETE CORPORATION, A CORPORATION OF NEW YORK

APPARATUS FOR STRIPPING MOLDS FROM PIPES

Application filed October 26, 1928. Serial No. 315,162.

This invention relates to an apparatus for stripping molds from pipes.

One of the objects of this invention is to provide stripping apparatus by which pipes and preferably concrete pipes of large diameter may be stripped of their molds and efficiently handled in the stripping operation and subsequently.

Still another object of my invention is to provide a support for a mold-enveloped pipe preferably comprising a pair of tracks by the use of which said mold-enveloped pipe may be rolled into stripping position and a horizontally-movable stripping mechanism preferably embodying an expansible gripping device movable axially or longitudinally in one direction for insertion into the pipe and movable axially or longitudinally in the opposite direction to separate the pipe from the mold.

Another object of my invention is to provide means for independently supporting the pipe during the withdrawal movement thereof and preferably to provide a movable support for guiding and supporting the pipe during its separating movement and thereafter releasing the said movable support from the pipe to cause it to come to rest on a fixed support preferably comprising tracks parallel with the tracks on which the mold is initially supported.

Still another object of my invention is to provide in a device of this kind, a contractible and expansible gripping device adapted, in contracted position, to be inserted within a mold-enveloped pipe and to be expanded preferably by a screw and nut means into frictional contact with the interior surface of the pipe and to provide in combination with such frictional gripping means, a means for moving the gripping device axially to separate the molded pipe from the mold.

Another object of the invention is to provide, in a device of the character specified, means operable automatically by the movement of the stripping mechanism for supporting the pipe during its outward movement from the mold until it reaches its separated position.

Still another object of the invention is to provide a horizontal stripping mechanism which is mounted on a portable support having transverse tracks adapted to be moved into registration with other tracks to permit ready mounting and dismounting of the molds and pipes.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a side elevation of stripping apparatus embodying my invention and showing the application of the stripper and starting of the stripping operation;

Fig. 2 is a view similar to Fig. 1, showing the stripping operation completed;

Fig. 3 is a section on the line 3—3 of Fig. 1;

Fig. 4 is a section on the line 4—4 of Fig. 1;

Fig. 5 is an enlarged fragmentary section on the line 5—5 of Fig. 7, showing the position of the parts at the beginning of the withdrawal or stripping operation;

Fig. 6 is a view similar to Fig. 5, showing the position of the parts after the pipe is withdrawn;

Fig. 7 is an enlarged section on the line 7—7 of Fig. 6;

Fig. 8 is a fragmentary section on the line 8—8 of Fig. 5; and

Fig. 9 is a fragmentary plan view of the movable supporting element for the pipe and adjacent parts.

Referring now to these drawings, which illustrate a preferred embodiment of my invention, 1, 1ª indicate tracks on which is mounted a truck or car 2. As shown, the truck is provided with three pairs of wheels 3 rotatable on axles 4 on which support the truck 2, which is preferably an elongated structure composed, as shown, of channeled beams 5, 5 connected together by suitable transverse members 6.

The truck 2 is preferably provided at one end with transverse tracks 7 adapted upon movement of the portable truck to register with other tracks extending into a kiln from which tracks, pipes may be rolled onto the tracks 7 on the portable truck 2. The truck is preferably made portable so that it may be moved into registration with pipe tracks of a plurality of kilns.

Mounted on the truck 2 on a pair of longitudinal tracks 8 is a pipe-stripping mechanism 10 embodying, as shown, a horizontally-disposed axially-extending screw shaft 11 rotatably supported in a supporting structure 12, the forward end 12' of which projects outwardly and is adapted to support the screw shaft 11 and to permit its insertion within the mold, said supporting structure 12 has its rear end 12ª mounted on a carriage 13 supported on pairs of wheels 14, 14' which are adapted to move along longitudinal tracks 8. The screw shaft supporting structure 12 is preferably adjustably mounted upon the carriage 13 and, as illustrated, angle irons 12ᵇ of said structure fit within angle irons 13' of the carriage 13 and these members are provided with holes 12ᶜ and 13ª adapted to register and into which bolts may be inserted for the purpose of adjustably mounting the screw-supporting structure 12.

Mounted on the projecting end of the screw shaft 11 is an interior gripping device 15 which is contractible to permit insertion within the interior of the pipe and is expansible to grip the interior surface of the pipe. As illustrated, the gripping device is a three-way gripper and comprises three pairs of identical toggle levers 15' each pair having pivotal connections at the outer ends with a contact shoe 15ª and having pivotal connections at the inner ends with a relatively stationary head 15ᵇ and a travelling nut 15ᶜ threaded on screw threads 11' formed on the outer end of the screw shaft 11. Obviously, the turning of the screw shaft 11 will thus move the arms 15' to cause an outward or inward movement of the shoe 15ª toward and away from the interior surface of the pipe. The projecting interior gripping device may thus be inserted into a pipe and the screw shaft 11 rotated to procure a firm three-way grip upon the interior surface of the pipe P. As illustrated, I have provided on the shaft 11 at the opposite or rear end of the supporting structure 12, a hand wheel 16 for turning the said screw shaft 11. Obviously on turning the hand wheel 16 the nut 15ᶜ will be caused to move along the screw and the arms 15' extended to cause the shoes 15ª to be moved outwardly into contact with the interior surface of the pipe P within the mold M. It will be apparent that the three-way expansion gripping device may be used to contact with all sizes of pipes and that the hand wheel 16 may be operated to tighten the shoes 15ª against the inner surface so as to produce a secure grip on said interior of the pipe. The molds then containing the pipe are provided with suitable stop devices for retaining the mold in stationary position during the withdrawal of the pipe therefrom and, as illustrated, the molds are provided with rings m, m' which are spaced to engage the sides of the transverse tracks 7 on which the mold is mounted and thus to stop or prevent a sliding movement of the mold during the withdrawal of the pipe therefrom.

Suitable means is provided for pulling the screw shaft 11 outwardly when the gripper mounted thereon has been so tightened, as aforesaid and, as illustrated, I provide at the end of the shaft an attaching hook 17 and connect thereto a cable or flexible connection 18 which is operable by a suitable winch mechanism 19. As illustrated the cable 18 is passed over an idler 20 mounted on an adjustable shaft 20' in a bearing bracket 21 and is thence passed around and anchored to a winch-drum 22 mounted on a shaft 22' supported in said bracket 21 and rotated by a worm gear comprising a worm wheel 23 mounted on a shaft 22' and a worm 24 mounted on a sleeve 25 rotatable on a shaft 24' and coupled and uncoupled from said shaft 24' by means of a clutch 32, said shaft 24' being turned by a worm wheel 26 meshing with a worm 27 on a shaft 28 of a motor 29. As illustrated, said shaft 24' is mounted in bearings 30, 31 and one-half of the clutch 32 is integral with the sleeve 25 and worm 24 and is loose on the shaft 24' while the other half 31' is fixed to said shaft 24'. This arrangement enables the motor to be alternately used for driving the winch drum 22 and the truck 2. For the purpose of so driving the truck 2 a shaft 33 is mounted at one end in the bearing 30 and at the other end in a bearing bracket 34 and is similar coupled and uncoupled by means of a clutch 35 with a worm sleeve 36 formed integrally with a worm 37 meshing with a worm wheel 38 on the axle 4 of the truck 2.

From the above it will be seen that rotation of the drum 22 by the motor 29 will cause a pull by the cable 18 to be exerted axially on the screw shaft 11, the idler 20 being adjustable in the bracket 21 through the medium of the holes 21' to permit the cable 18 to exert an axial pull upon the shaft in varying vertical positions for varying diameters of pipe.

In order to shorten and lengthen the cable 18, the end thereof is preferably provided with chain links 18ª for connection with the hook 17.

When the motor is driven to exert a pull on the cable 18, the carriage 13, supporting structure 12 and screw 11 will be moved on the tracks 8 to withdraw the pipe P from the mold M.

Mechanism is provided which is operable during the outward movement of the pipe to engage the outer surface thereof and to support the same during such outward movement until it comes to rest on a pair of transverse pipe tracks 40 disposed parallel to the transverse mold tracks 7 on which the pipe and mold are initially mounted.

The mechanism for supporting the pipe during its movement outwardly from the mold preferably comprises a longitudinally movable supporting element 41 mounted on wheels 42 running on tracks 43 (see particularly Figs. 4 to 9 inclusive) and this movable supporting element 41 is preferably provided with means for moving the same upwardly into contact with the pipe during a part of its outward movement and after completion of the same to be lowered away from the pipe when it reaches a position in which it will rest upon the tracks 40. As illustrated, the said movable supporting element 41 in its rearward position is supported upon an elevator 44 movable vertically through an opening 44' formed in the floor of the truck 2. The elevator 44 is provided at its upper end with sectional tracks 45 registering with the tracks 43 having a stop 46 at the rear ends thereof so as to permit the movable supporting element 41 to be mounted on the said tracks and stopped by said stop.

Means for moving the elevator 44 into engagement with the pipe as it is moving outwardly from the mold is provided and, as illustrated, the lower end of the elevator 44 is pivoted at 47 to a lever 48 mounted below the truck and pivoted intermediate its ends at 49 on a bracket 50 and preferably having its opposite end extending upwardly through an opening 51 and rounded so as to provide a shoe portion 48' which will be engaged and depressed by the bottom of the carriage 13 during its movement along the tracks 8 to elevate the elevator.

It will be seen that I have thus provided means which will be operable automatically to move the movable supporting element into contact with the pipe beneath the same as it is moved outwardly. This movable supporting element when so moved into contact with the outer surface of the pipe will, by a frictional engagement therewith, be moved over the sectional tracks 45 and along the tracks 43, and during such movement will provide a movable support the moving pipe P. When the pipe P, however, reaches its outward limit of movement over the transverse pipe tracks 40 the tracks 43 for said movable supporting element are provided with a depressed portion 43', and said movable supporting element, when it rolls into this depressed portion 43' will be gradually released from the pipe which will then be supported upon the transverse pipe tracks 40. The pipe may now be rolled on these pipe tracks off the truck 2 onto registering tracks which may lead to any suitable location in the plant, and the mold may likewise be moved on its tracks to any suitable location.

The carriage 13 is provided with a projecting pusher 13ᵇ which, upon a return of the carriage, will engage the movable supporting element 41 and return it to its initial position on the depressed elevator.

In order to maintain the carriage 13 on the tracks and to balance the overhanging projections, I preferably provide the same at the rear end thereof with a weight 13ᶜ.

Having described my invention, I claim:—

1. Apparatus for stripping molds from pipes, embodying, in combination, a supporting structure, a pair of tracks on said supporting structure arranged to receive a mold containing a pipe, rings on the outer surface of the mold engageable with said tracks to prevent an axial movement thereof in relation to said tracks, a gripping device movable axially into the pipe within said mold and expansible to grip the interior surface of said pipe, a carriage on which said gripping device is mounted, and means for exerting an axial pull on said gripping device and carriage to separate the pipe from its mold.

2. Apparatus for stripping molds from pipes, embodying, in combination, a support for a mold containing a pipe in horizontal position, means on said support for engaging the mold to prevent longitudinal movement in relation to said support, a gripping device expansible to grip the interior surface of the pipe within the mold, means for exerting a pulling action on said gripping device to separate the pipe from the mold, and means movable longitudinally by the pipe during its separating movement for supporting said pipe during said separating movement.

3. Apparatus for stripping molds from pipes, embodying, in combination, a supporting structure, a pair of tracks on said supporting structure arranged to receive a mold containing a pipe, means on the mold for engaging said tracks to prevent an axial movement thereof in relation to said tracks, a gripping device movable axially into the pipe within said mold and expansible to grip the interior surface of said pipe, means for exerting a pull on said gripping device to separate the pipe from its mold, and a supporting element movable longitudinally beneath the pipe and adapted to contact and move with the pipe during its separating movement out of the mold.

4. Apparatus for stripping molds from pipes, embodying, in combination, a supporting structure, a pair of tracks on said supporting structure arranged to receive a mold containing a pipe, means on the mold for engaging said tracks to prevent an axial movement thereof in relation to said tracks, a gripping device movable axially into the pipe within said mold and expansible to grip the interior surface of said pipe, means for exerting a pull on said gripping device to separate the pipe from its mold, a supporting element movable longitudinally beneath the pipe and adapted to contact and move with the pipe during its separating movement out of the mold, and means for elevating said movable supporting element into contact with the pipe during its separating movement from the mold.

5. Apparatus for stripping molds from pipes, embodying, in combination, a supporting structure, a pair of tracks on said supporting structure arranged to receive a mold containing a pipe, means on the mold for engaging said tracks to prevent an axial movement thereof in relation to said tracks, a gripping device movable axially into the pipe within said mold and expansible to grip the interior surface of said pipe, means for exerting a pull on said gripping device to separate the pipe from its mold, a supporting element movable longitudinally beneath the pipe and adapted to contact and move with the pipe during its separating movement out of the mold, means for elevating said movable supporting element into contact with the pipe near the start of its separating movement from the mold, and means for lowering said movable support out of contact with the pipe when the pipe reaches its outward limit of movement.

6. Apparatus for stripping molds from pipes, embodying, in combination, a supporting structure, a pair of tracks on said supporting structure arranged to receive a mold containing a pipe, means on the mold for engaging said tracks to prevent an axial movement thereof in relation to said tracks, a gripping device movable axially into the pipe within said mold and expansible to grip the interior surface of said pipe, a carriage on which said gripping device is portably mounted, means for exerting a pull on said gripping device and carriage to separate the pipe from its mold, a movable supporting element for the pipe, and means operable automatically by the movement of the gripping device and carriage for elevating said movable support into contact with the bottom of the pipe during its separating movement out of the mold.

7. Apparatus for stripping molds from pipes, embodying, in combination, a supporting structure, a pair of tracks on said supporting structure arranged to receive a mold containing a pipe, means on the mold for engaging said tracks to prevent an axial movement thereof in relation to said tracks, a gripping device movable axially into the pipe within said mold and expansible to grip the interior surface of said pipe, a carriage on which said gripping device is portably mounted, means for exerting a pull on said gripping device and carriage to separate the pipe from its mold, a movable supporting element for the pipe, means operable automatically by the movement of the gripping device and carriage for elevating said movable support into contact with the bottom of the pipe during its separating movement out of the mold, and means for lowering said movable support out of contact at the end of the separating movement of the pipe.

8. Apparatus for stripping molds from pipes, embodying, in combination, a supporting structure, a pair of tracks on said supporting structure arranged to receive a mold containing a pipe, means on the mold for engaging said tracks to prevent an axial movement thereof in relation to said tracks, a gripping device including a screw shaft, means for supporting the same to project within the pipe, a nut on said shaft, lever arms connected with the said nut and operable by movement thereof on the shaft to cause an expansion of the lever arms, a contact shoe carried by said arms, and means for exerting a pull longitudinally on said shaft to separate the pipe from its mold.

9. Apparatus for stripping molds from pipes embodying, in combination, a supporting structure, a pair of tracks on said supporting structure arranged to recieve a mold containing a pipe, means on the mold for engaging said tracks to prevent an axial movement thereof in relation to said tracks, a gripping device including a screw shaft, means for supporting the same to project within the pipe, a nut on said shaft, lever arms connected with the said nut and operable by movement thereof on the shaft to cause an expansion of the lever arms, a carriage for supporting said gripping device, and means for exerting a pull on said shaft and carriage to separate the pipe from its mold.

10. Apparatus for stripping holds from pipes embodying, in combination, a supporting structure, a pair of tracks on said supporting structure arranged to receive a mold containing a pipe, means on the mold for engaging said tracks to prevent in axial movement thereof in relation to said tracks, a gripping device including a screw shaft, means for supporting the same to project within the pipe, a nut on said shaft, lever arms connected with the said nut and operable by movement thereof on the shaft to cause an expansion of the lever arms, a carriage for supporting said gripping device, means for exerting a pull on said shaft and carriage to separate the pipe from its mold, and a movable supporting element for engaging and supporting the pipe during its movement out of the mold.

11. Apparatus for stripping molds from pipes embodying, in combination, a supporting structure, a pair of tracks on said supporting structure arranged to receive a mold containing a pipe, means on the mold for engaging said tracks to prevent an axial movement thereof in relation to said tracks, a gripping device including a screw shaft, means for supporting the same to project within the pipe, a nut on said shaft, lever arms connected with the said nut and operable by movement thereof on the shaft to cause an expansion of the lever arms, a carriage for supporting said gripping device, means for exerting a pull on said shaft and carriage to separate the pipe from its mold, a movable supporting element for engaging and supporting the pipe during its movement out of the mold, and means for releasing said movable element from contact with the pipe when the said pipe has reached its outward limit of movement.

12. Apparatus for stripping molds from pipes embodying, in combination, a supporting structure, a pair of transverse tracks on said supporting structure arranged to receive a mold containing a pipe, means on the mold for engaging said tracks to prevent an axial movement thereof in relation to said tracks, a pair of longitudinal tracks on said support, a carriage mounted on said longitudinal tracks, a gripping device mounted on said carriage, and winch mechanism for exerting a pull on said gripping device and carriage.

13. Apparatus for stripping molds from pipes embodying, in combination, a supporting structure, a pair of transverse tracks on said supporting structure arranged to receive a mold containing a pipe, means on the mold for engaging said tracks to prevent an axial movement thereof in relation to said tracks, a pair of longitudinal tracks on said support, a carriage mounted on said longitudinal tracks, a gripping device mounted on said carriage, winch mechanism for exerting a pull on said gripping device and carriage, a movable supporting element adapted to contact and move with the pipe during its separating movement out of the mold, and means operable automatically by the movement of the gripping device and carriage for elevating said movable support into contact with the bottom of the pipe during its separating movement out of the mold.

14. Apparatus for stripping molds from pipes embodying, in combination, a supporting structure, a pair of transverse tracks on said supporting structure arranged to receive a mold containing a pipe, means on the mold for engaging said tracks to prevent an axial movement thereof in relation to said tracks, a pair of longitudinal tracks on said support, a carriage mounted on said longitudinal tracks, a gripping device mounted on said carriage, winch mechanism having a cable connected to said shaft for exerting a pull on the same and another cable having a connection with said carriage arranged to retain a pull in the opposite direction to provide a compensating arrangement with the pulling cable and to move the carriage in the opposite direction.

15. Apparatus for stripping molds from pipes embodying, in combination, a portable truck, a pair of sectional tracks extending transversely on said truck and adapted to receive a mold containing the pipe, means on the mold for engaging said tracks to prevent a longitudinal movement in relation to the said tracks, a second pair of sectional tracks extending parallel to the first-mentioned tracks, a pipe-stripping mechanism embodying a gripping device movable within the pipe and having arms expansible into contact with the interior surface of the pipe, means for exerting a pull horizontally on said gripping device to separate the pipe from its mold and to rest the same upon said second pair of tracks, and a movable support operable to contact and move with the pipe to support the same during its movement out of the mold.

16. Apparatus for stripping molds from pipes embodying, in combination, a portable truck, a pair of sectional tracks extending transversely on said truck and adapted to receive a mold containing the pipe, means on the mold for engaging said tracks to prevent a longitudinal movement in relation to the said tracks, a second pair of sectional tracks extending parallel to the first-mentioned tracks, a pipe-stripping mechanism embodying a gripping device movable within the pipe and having arms expansible into contact with the interior surface of the pipe, means for exerting a pull horizontally on said gripping device to separate the pipe from its mold and to rest the same upon said second pair of tracks, a movable support operable to contact and move with the pipe to support the same during its movement out of the mold, and means for releasing said movable support from contact with the pipe when the said pipe has reached its outward limit of movement.

17. Apparatus for stripping molds from pipes embodying, in combination, a portable truck, a pair of transverse section tracks extending transversely on said truck and adapted to receive a mold containing the pipe, means on the mold for preventing a longitudinal movement in relation to the said tracks, a second pair of transverse sectional tracks on said structure extending parallel to the first-mentioned tracks, a third pair of tracks on said structure extending longitudinally thereof, a pipe-stripping mechanism embodying a gripping device movable within the pipe and having arms expansible into contact with the interior surface of the pipe, means for exerting a pull horizontally on said gripping device to separate the pipe from its mold and to rest the same upon said second pair of tracks, a movable support operable to contact, move with and support the pipe during its movement out of the mold, means for moving said movable support into contact with the mold near the beginning of its outward movement from the mold, means for releasing said movable support from contact with the mold when the pipe has reached its outward limit of movement, a carriage on which said gripping device is mounted, and means operable automatically by the carriage for moving said movable supporting element into contact with the pipe near the beginning of its outward movement, and means for releasing said movable support from contact with the pipe near the outward limit of said separating movement.

In witness whereof, I have signed my name to the foregoing specification.

ROBERT M. WEIR.